United States Patent [19]

Greaves et al.

[11] Patent Number: 5,665,447
[45] Date of Patent: Sep. 9, 1997

[54] SOUND SCREEN INSULATION WITH ASPHALT SEPTUM

[75] Inventors: Gerald G. Greaves, Granville, Ohio; Jeffrey J. Van Sloun, Rockford, Mich.; Catherine A. Barron, Reynoldsburg; Charles R. J. Weir, Westerville, both of Ohio

[73] Assignee: Owens-Corning Fiberglas Technology, Inc., Summit, Ill.

[21] Appl. No.: 544,687

[22] Filed: Oct. 18, 1995

[51] Int. Cl.$^6$ ................... B32B 3/02; E04B 1/82
[52] U.S. Cl. ............... 428/68; 181/284; 181/285; 181/286; 181/287; 181/290; 181/291; 181/294; 428/70; 428/74; 428/213; 428/214; 428/220; 428/323; 428/324; 428/325; 428/331; 428/489
[58] Field of Search ................... 428/68, 70, 74, 428/213, 214, 220, 285, 286, 291, 323, 324, 325, 331, 489; 181/284, 285, 286, 287, 290, 291, 294

[56] References Cited

U.S. PATENT DOCUMENTS

| | | | |
|---|---|---|---|
| 2,160,729 | 5/1939 | Graham et al. | 428/282 |
| 2,221,499 | 11/1940 | Torri | 106/277 |
| 2,636,543 | 4/1953 | Groskopf | 181/284 |
| 2,956,917 | 10/1960 | Fasano | 428/255 |
| 3,249,659 | 5/1966 | Voelker | 264/47 |
| 3,336,185 | 8/1967 | Helbing | 427/389.8 |
| 3,950,207 | 4/1976 | De Zuloaga Amat | 428/489 |
| 3,957,940 | 5/1976 | Schubert et al. | 264/171 |
| 4,204,022 | 5/1980 | Snyder et al. | 428/337 |
| 4,208,230 | 6/1980 | Magarian | 156/184 |
| 4,273,685 | 6/1981 | Marzocchi et al. | 428/392 |
| 4,287,263 | 9/1981 | Maeda et al. | 181/290 |
| 4,288,475 | 9/1981 | Meeker | 427/294 |
| 4,333,866 | 6/1982 | Uffner | 524/534 |
| 4,349,590 | 9/1982 | Bolen et al. | 429/389.7 |
| 4,357,377 | 11/1982 | Yamamoto | 428/489 |
| 4,381,200 | 4/1983 | Bolen et al. | 106/282 |
| 4,536,911 | 8/1985 | Demetriades | 15/230.12 |
| 4,622,192 | 11/1986 | Ma | 264/136 |
| 4,696,847 | 9/1987 | Cousin | 428/489 |
| 4,777,086 | 10/1988 | Madden et al. | 428/285 |
| 4,826,722 | 5/1989 | Debouzie et al. | 428/280 |
| 5,094,318 | 3/1992 | Maeda et al. | 181/290 |
| 5,130,186 | 7/1992 | Pourtau | 428/489 |
| 5,151,146 | 9/1992 | Green | 156/177 |
| 5,211,988 | 5/1993 | Morton | 427/370 |
| 5,274,200 | 12/1993 | Das et al. | 181/202 |
| 5,294,461 | 3/1994 | Ishida | 427/293 |
| 5,310,600 | 5/1994 | Tsuya | 428/378 |
| 5,336,526 | 8/1994 | Spoo et al. | 427/372.2 |
| 5,492,722 | 2/1996 | Tait et al. | 427/211 |

*Primary Examiner*—Nasser Ahmad
*Attorney, Agent, or Firm*—C. Michael Gengenheimer; Curtis B. Brueske

[57] ABSTRACT

A panel for an office sound screen includes a core which includes an asphalt layer and insulation layers positioned on both sides of the asphalt layer. Preferably the asphalt layer has a thickness between 0.030 inch (0.076 cm) and 0.125 inch (0.318 cm). The asphalt layer acts as an adhesive so that the insulation layers are laminated thereto. Preferably the insulation layers are made from a fibrous glass wool insulating material having a density between 0.5 pounds per cubic foot (8 kg/m$^3$) and 5 pounds per cubic foot (80 kg/m$^3$). The panel further includes a cover layer positioned on at least one side of the core.

13 Claims, 5 Drawing Sheets

SOUND SCREEN INSULATION WITH ASPHALT SEPTUM

TECHNICAL FIELD

This invention relates in general to insulation products, and more specifically to an insulation product suitable for use in an office sound screen to reduce sound between the office workers.

BACKGROUND ART

In recent years the trend in office buildings has been away from individual rooms for each office worker and toward the use of a single large room to create offices for a number of workers. This is thought to promote communication between the office workers to enhance their performance. This also provides more efficient use of building space and reduces costs. In view of the number of office workers present in a single room, however, there is a problem of increased sound levels distracting the workers. Consequently, a conventional practice is to position office sound screens or dividers between the individual offices to reduce the sound.

An office sound screen includes a vertically extending panel which is generally flat and rectangular in shape. Sometimes a raceway for electrical wires is positioned along the base of the sound screen below the panel. Usually a metal frame is positioned around the edges of the panel. The dimensions of a sound screen can vary widely, but a typical sound screen may be about 5 feet (1.5 meters) high, about 3 feet (0.9 meters) wide, and about 2½ inches (6.35 cm) thick.

The panel of an office sound screen is constructed of several layers of material, including a sound reducing core. A conventional core includes a layer of chipboard, which is a strong, low density paper board made from mixed waste paper. The core further includes a layer of insulation on both sides of the chipboard, typically fiberglass insulation. Optionally a thin, tackable layer of material such as a high density glass fiber board is positioned on both sides of the core. This layer is provided to enable the office workers to tack or pin papers or similar items to the sound screen if desired. A cloth fabric covers both faces of the panel and is attached to the metal frame and the raceway.

Unfortunately, the material and assembly cost of the conventional panel is relatively high. The chipboard material used to make the core layer is relatively expensive. Further, the assembly cost is relatively high because the panel is assembled by handling the two layers of insulation and the layer of chipboard separately. The office furniture market, like many other markets, has shifted to more economical products. Thus, it would be desirable to provide an office sound screen that is effective in reducing sound, and that also has reduced material and assembly costs compared to the conventional sound screen.

DISCLOSURE OF INVENTION

This invention relates to an improved panel for an office sound screen. The panel includes a core comprising an asphalt layer and insulation layers positioned on both sides of the asphalt layer. Preferably the asphalt layer has a thickness between about 0.030 inch (0.076 cm) and about 0.125 inch (0.318 cm). The asphalt layer acts as an adhesive so that the insulation layers are laminated thereto. Preferably the insulation layers are made from a fibrous glass wool insulating material having a density between about 0.5 pounds per cubic foot (8 kg/m³) and about 5 pounds per cubic foot (80 kg/m³). The panel further includes cover layers preferably positioned on both sides of the core. Tackable layers can be positioned between the insulation layers and the cover layers.

The panel for an office sound screen in accordance with this invention has reduced material costs because the asphalt core is less expensive than the chipboard material used in a conventional panel. The asphalt laminates the two insulation layers together so that the layers can all be handled and assembled as a single unit. This saves labor and processing steps and thus reduces assembly costs. The panel is effective in absorbing sound and reducing the transmission of sound.

Various objects and advantages of this invention will become apparent to those skilled in the art from the following detailed description of the preferred embodiment, when read in light of the accompanying drawings.

BEST MODE FOR CARRYING OUT THE INVENTION

Figure 1:
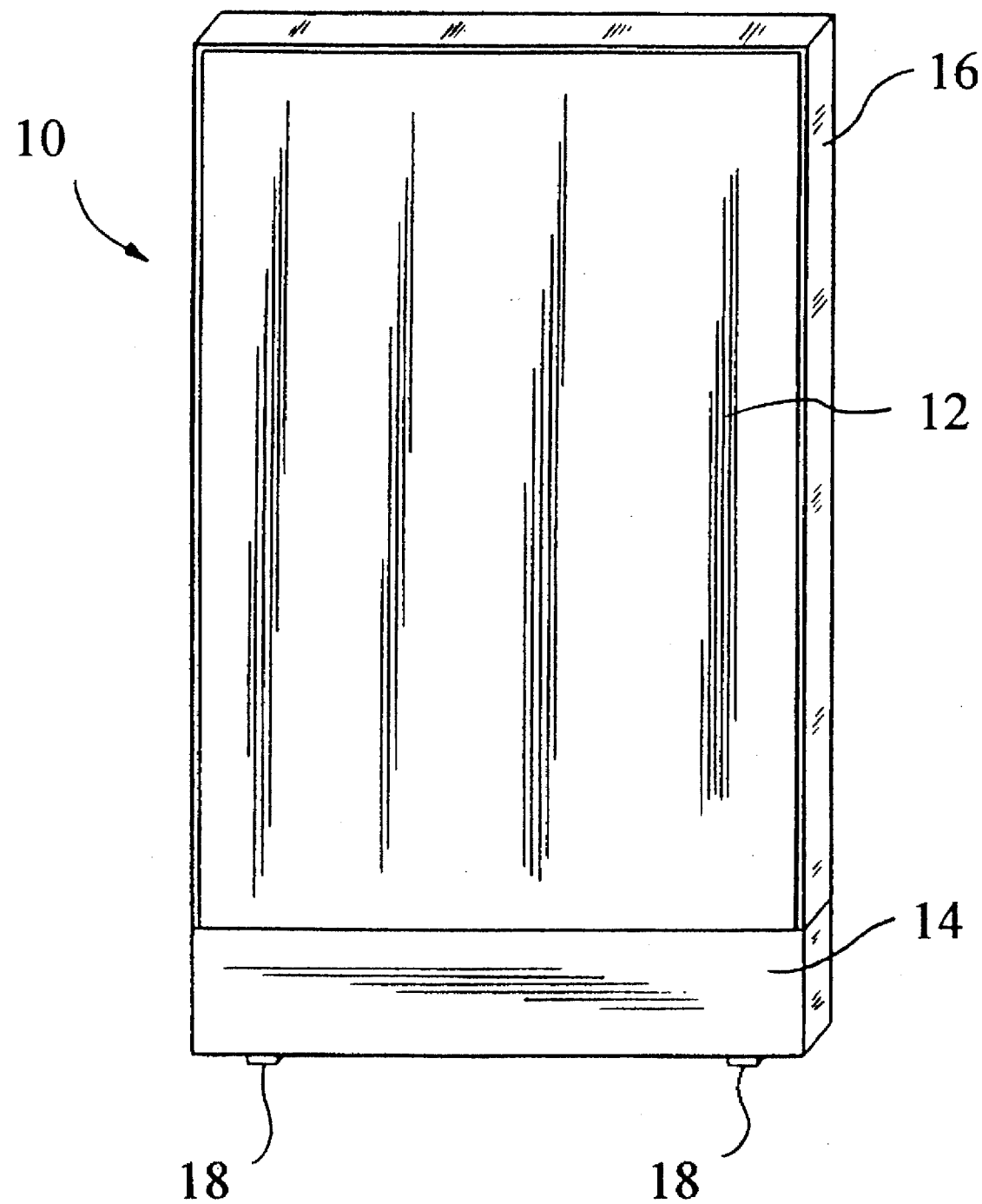
FIG. 1 is a perspective view of an office sound screen including a panel in accordance with this invention.

Referring now to the drawings, there is illustrated in FIG. 1 an office sound screen, indicated generally at 10. The sound screen 10 includes a vertically extending panel 12 in accordance with this invention. The preferred panel 12 is generally flat and rectangular in shape. It is to be understood, however, that the panel 12 can be other shapes such as square or rounded. The sound screen 10 preferably also includes a raceway 14 positioned along the base of the sound screen below the panel 12. The raceway 14 is a generally rectangular, hollow enclosure for electrical wires attached to electrical outlets (not shown) in the wall of the raceway. The raceway 14 also serves as a kick plate for the sound screen 10. Preferably a rigid time 16 is positioned around three edges of the panel 12. If the sound screen 10 does not include a raceway 14, the time 16 can be positioned around all four edges of the panel 12. The raceway 14 and frame 16 are generally formed from a metallic material, and preferably from steel, although other materials such as plastics or composites can also be used. Four supports 18 (two of which are shown) are preferably positioned at the base of the sound screen 10. Wheels could also be positioned at the base to facilitate movement of the sound screen.

Figure 2:
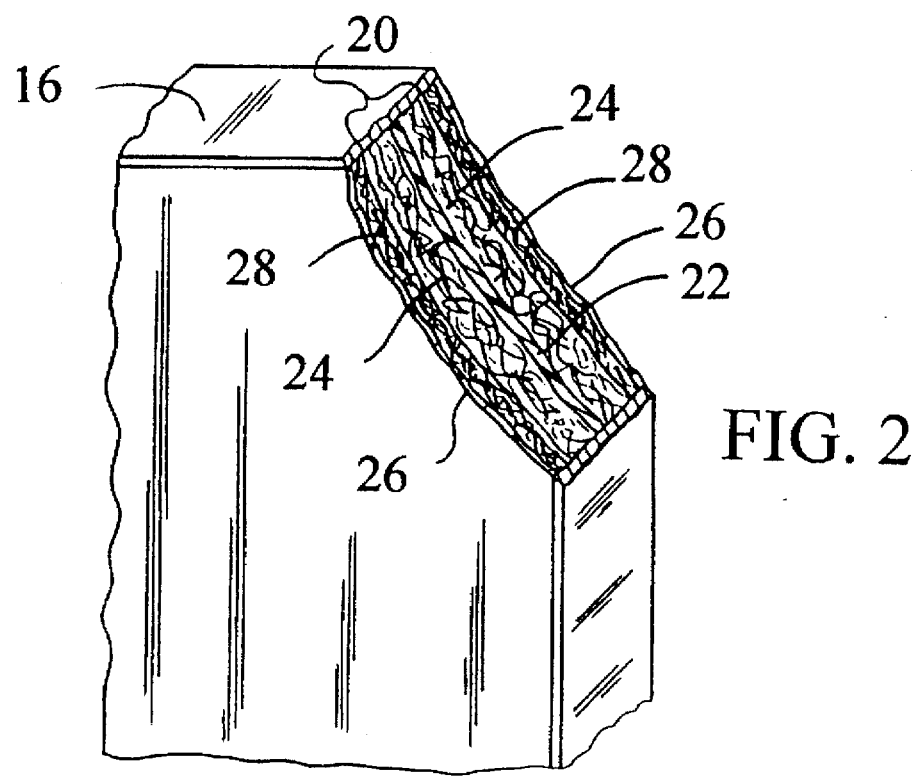
FIG. 2 is a cutaway view of the upper right corner of the sound screen of FIG. 1 illustrating the layers of material used to make the sound screen.

As illustrated in FIG. 2, the panel 12 is constructed of several layers of material which will be described in more detail below. The panel 12 includes a sound reducing core 20. An asphalt layer 22 is positioned in the interior of the core 20. The core 20 further includes insulation layers 24 positioned on both sides of the asphalt layer 22 and laminated thereto. A cover layer 26 is positioned on at least one side of the core 20, and preferably cover layers 26 are positioned on both sides of the core 20. Optionally, at least one tackable layer 28 is positioned between at least one insulation layer 24 and cover layer 26, and preferably tackable layers 28 are positioned between both insulation layers 24 and cover layers 26.

Figure 3:
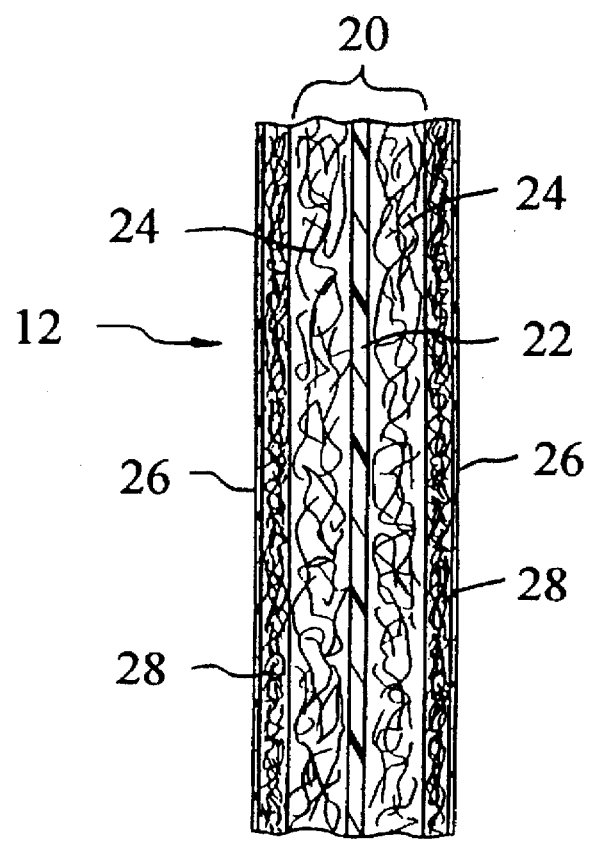
FIG. 3 is a cross-sectional view of the layers of material used to make the panel in accordance with this invention.

Referring now to FIG. 3, the layers of material in the panel 12 are illustrated and described in more detail. An asphalt layer 22 is positioned in the interior of the core 20. The asphalt layer 22 provides a barrier that reduces the amount of sound transmitted through the sound screen, and thus reduces the amount of sound transmitted from one office to the next. The amount of sound transmission can be measured by a Sound Transmission Class ("STC") according to the standard method ASTM E90-90. The STC is measured on a scale from 0 decibels, meaning all the sound is transmitted, to approximately 70 decibels meaning almost no sound is transmitted. The STC is a single number that represents the ratio of sound energy striking the sound screen relative to the transmitted sound energy over a range of frequencies. It is expressed in decibels. Preferably the STC of the core 20 in accordance with this invention is between about 10 decibels and about 50 decibels, and more preferably between about 20 decibels and about 40 decibels. The amount of sound transmission is related to the mass of the asphalt layer 22. Preferably the asphalt layer 22 has a thickness between about 0.030 inch (0.076 cm) and about 0.125 inch (0.318 cm).

The type of asphalt used in the asphalt layer 22 is not critical. The asphalt can be any bituminous material such as tars, pitches or asphalts. The asphalt can be any natural or petroleum derived asphalt. The common source of asphalt is the residue or bottoms from the petroleum refining industry which includes those commonly referred to as paving grade, roofer's flux, propane washed and air-blown.

The asphalt can optionally be modified with a polymer to give it improved flexibility on handling and improved resistance to flow to prevent changes in thickness from top to bottom in the sound screen. A preferred polymer is a styrene/butadiene copolymer such as Kraton 1101 (20% styrene, 75% butadiene) from Shell Co., Houston, Tex. The weight ratio of asphalt to polymer is preferably between about 6:1 and about 20:1. The polymer can be mixed into the asphalt under high shear at 300° F. (149° C.) to 400° F. (204° C.).

Another preferred polymer is formed by copolymerization of SBS thermoplastic rubber and styrene monomer. Such a polymer is described in more detail in U.S. Pat. No. 4,273,685 to Marzocchi et al., issued Jun. 16, 1981, and U.S. Pat. No. 4,333,866 to Uffner, issued Jun. 8, 1982, both incorporated by reference herein.

Other polymers that may be useful as asphalt modifiers include ethylene copolymers such as Elvax®450 (ethylene vinyl acetate copolymer) or Elvaloy® AM (ethylene butylacrylate glycidyl methacrylate terpolymer) both made by Du Pont (Wilmington, Del.). Other polymers can include polybutadiene or polypropylene.

Various fillers can be incorporated into the asphalt layer 22 to increase the mass of the layer and thus reduce the amount of sound transmitted therethrough. Preferably the filler is selected from calcium carbonate, calcium oxide, clay, glass, mica, barium, and mixtures thereof. More preferably the filler is calcium carbonate because it is inexpensive and contributes significant mass. Additives can also be incorporated into the asphalt layer 22 to provide it with additional properties such as fire retardancy.

Referring again to FIG. 3, the core 20 additionally includes insulation layers 24 positioned on both sides of the asphalt layer 22. The insulation layers 24 function to absorb sound directed toward the sound screen, and thus reduce the amount of sound in the office. The amount of sound absorption can be measured by a Noise Reduction Coefficient ("NRC") according to the standard method ASTM C423-90. The NRC is measured on a scale from "0" meaning no sound is absorbed to "1.0" meaning all the sound is absorbed. Preferably the NRC of the core 20 in accordance with this invention is between about 0.5 and 1.0, and more preferably between about 0.55 and about 0.75. The amount of sound absorbed is related to the density and thickness of the insulation layers 24. Preferably each insulation layer is between about ½ inch (1.27 era) and about 2 inches (5.08 cm) thick, and more preferably between about ⅝₀ inch (1.588 cm) and about 1 inch (2.54 cm) thick.

A preferred insulating material for use as the insulation layers 24 of the core 20 is a mineral fiber insulating material. Mineral fiber insulating material can be formed from fibers of minerals such as glass, rock, slag or basalt. Preferably the insulating material is formed from glass fibers such as fibrous glass wool. Any conventional process can be used to make the glass wool. A preferred process is known as the rotary process, in which molten glass is placed into a rotating spinner which has orifices in the perimeter, and glass flows out the orifices to produce a downwardly falling stream of fibers which are collected on a conveyor. Another fiber forming process is a continuous or textile process in which glass fibers are mechanically pulled from the orificed bottom wall of a feeder or bushing containing molten glass.

The glass fibers from the rotary or continuous process are impregnated with about 20% or less by weight of a binder, and typically between about 5% and about 10% by weight of a phenolic resin binder such as phenol-urea-formaldehyde. Then the glass fibers are molded and cured to the desired density to form the fiberglass insulating material. Preferably the fiberglass insulating material used in the core 20 of this invention has a relatively low density between about 0.5 pounds per cubic foot (8 kg/m$^3$) and about 5 pounds per cubic foot (80 kg/m$^3$), more preferably between about 0.5 pounds per cubic foot (8 kg/m$^3$) and about 2 pounds per cubic foot (32 kg/m$^3$), and most preferably between about 0.9 pounds per cubic foot (14.4 kg/m$^3$) and about 1.5 pounds per cubic foot (24 kg/m$^3$). The glass fibers in the insulating material preferably have an average diameter between about 3 and about 25 microns, and more preferably between about 3 and about 12 microns. The fiber diameter and density of the glass wool can be varied to modify the sound absorption characteristics of the insulation layer. A thin plastic film or similar material can also be provided on the surface of the insulation layer for this purpose. Preferred fiberglass insulating material is commercially available from Owens-Corning Fiberglas Corporation, Toledo, Ohio.

When a roll coating method is used to prepare the core 20 as will be described below, preferably the mineral fiber insulating material is provided with sufficient binder to increase its tensile strength to better withstand the stresses of the method. When the mineral fibers are fibrous glass wool, preferably the glass Fibers are impregnated with at least about 8.5% by weight binder to achieve the desired tensile strength of at least about 18 lbs./6-inch width (8.16 kg/15.24-cm width). The preferred binder is phenol -urea-formaldehyde.

A glass fiber board insulating material is somewhat less preferred for use as the insulation layers of the core. The glass fiber board is formed from fibrous glass wool and impregnated with binder as described above. However, it is molded and cured to a relatively high density between about 6 pounds per cubic foot (96 kg/m$^3$) and about 28 pounds per cubic foot (448 kg/m$^3$). As a result, it is a more rigid, board-like insulating material than the lower density fiberglass insulating material described above.

This invention provides a processing advantage when using glass fiber board as the insulating material. Glass fiber board is conventionally produced in pieces that are not more than 4 feet (1.2 meters) long. However, a sound screen is typically about 5 feet (1.5 meters) high. In the past, the manufacturing process had to be changed at great expense to produce 5 feet (1.5 meters) long glass fiber boards suitable for use in a sound screen. This invention, on the other hand, allows two glass fiber board pieces to be placed together adjacent to each other to make up the 5 feet (1.5 meters) height (or other desired size) of the sound screen. Thus, the sound screen can be produced much more economically.

Figure 4:
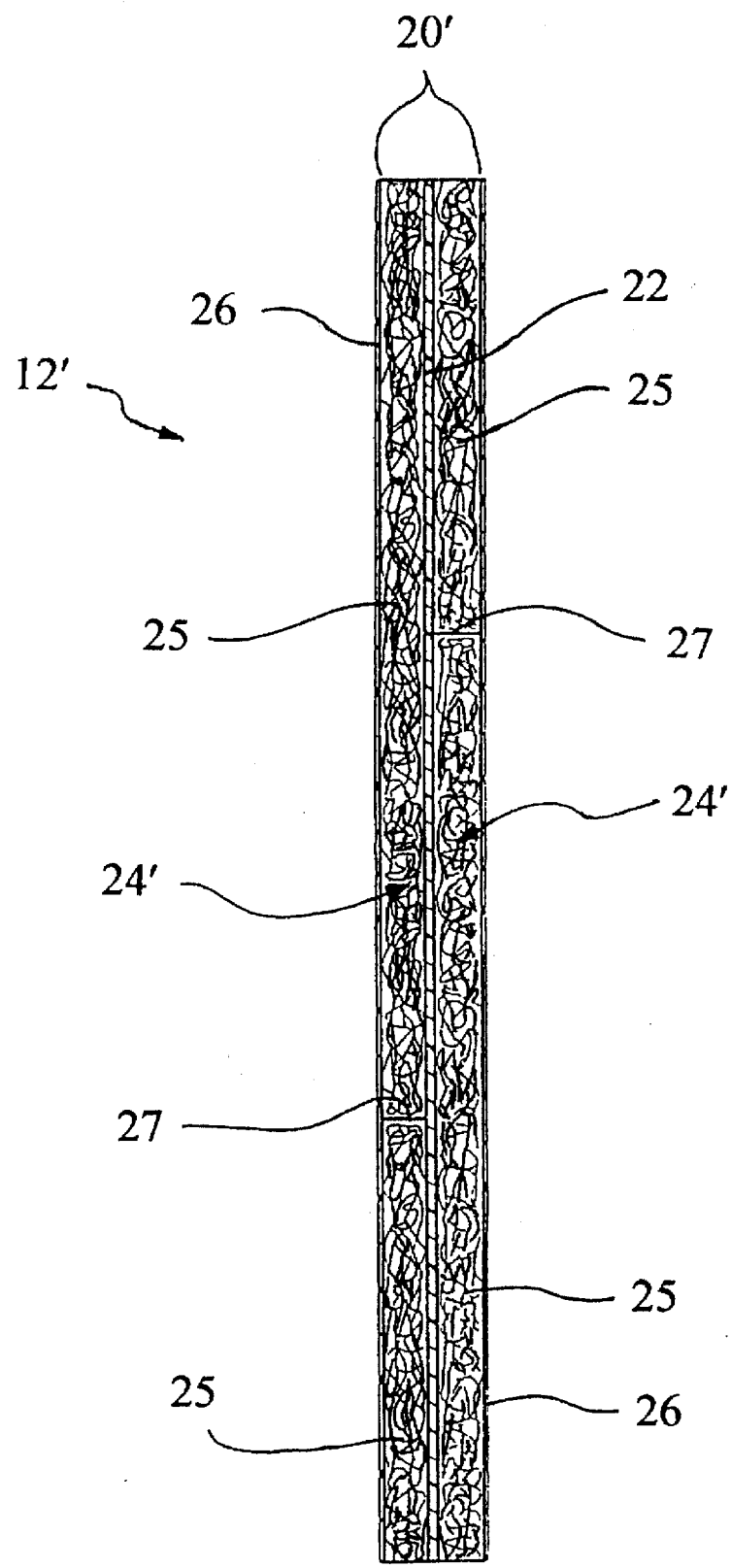
FIG. 4 is a cross-sectional view of an alternative embodiment of a panel in accordance with this invention.
Figure 5:
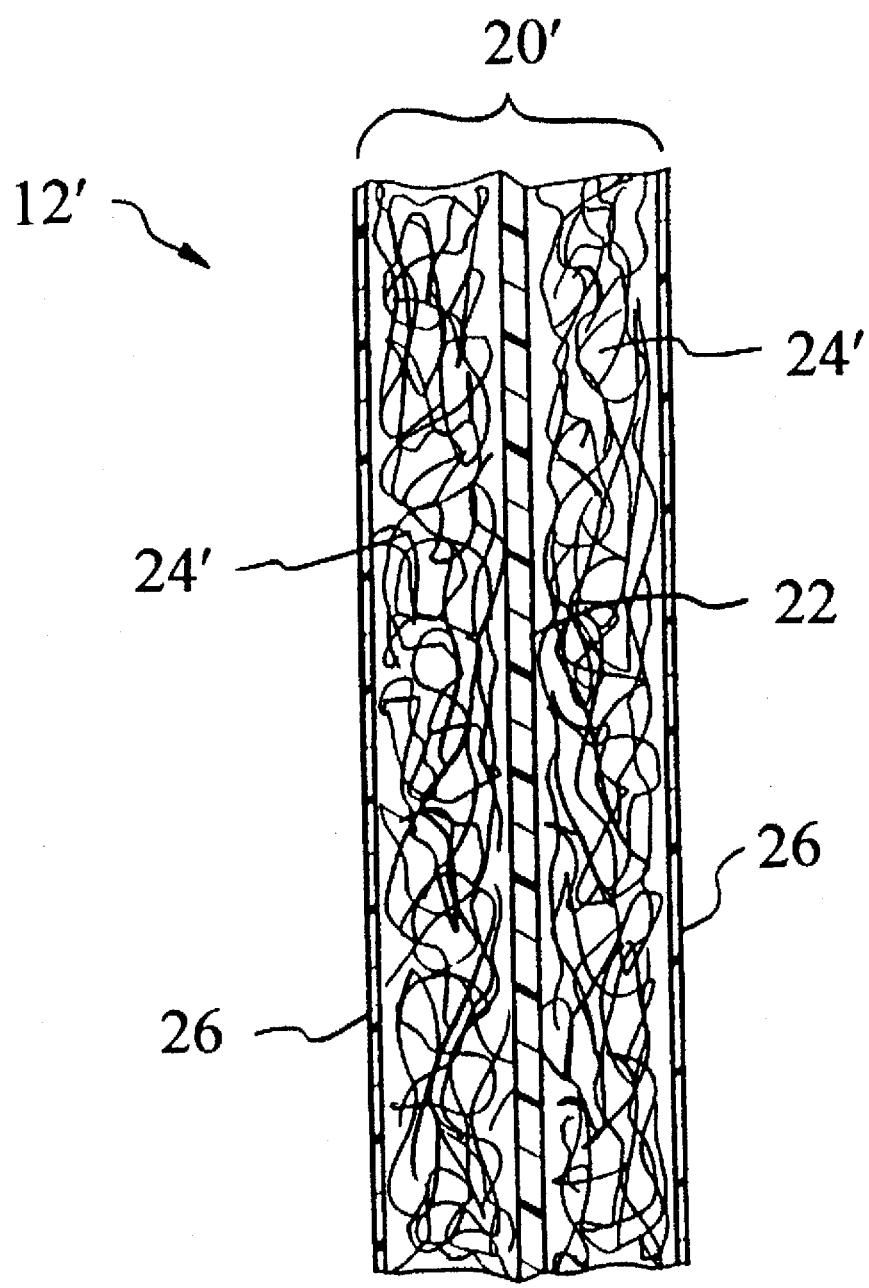
FIG. 5 is a cross-sectional view of the layers of material used to make the panel of FIG. 4.

FIGS. 4 and 5 illustrate a panel 12' for a sound screen including a core 20' in which each insulation layer 24' is made from two pieces 25 of glass fiber board. The core 20' is formed by placing two pieces 25 of glass fiber board adjacent to each other end to end. Then an asphalt layer 22 as shown in FIG. 4 is applied to the pieces 25. Then the remaining two pieces 25 of the glass fiber board are placed adjacent to each other onto the asphalt layer 22. The insulation layers 24' are laminated together by the asphalt layer 22. By positioning the pieces 25 so that the joints 27 between adjacent pieces 25 are not aligned, the core 20' has adequate strength for handling and the pieces 25 retain their proper vertical position. Cover layers 26 are positioned on both sides of the core 20'.

Another insulating material suitable for use as the insulation layers 24 of the core 20 is a foamed plastic insulating material. This foamed plastic insulating material is an open cell foam which absorbs sound in a manner similar to the way a fiberglass insulating material absorbs sound. Any kind of plastic can be used in the foamed plastic insulating material, including phenolic foam or polyester foam.

The two insulation layers 24 are laminated or bonded to the asphalt layer 22. In addition to its function in reducing sound transmission, the asphalt layer 22 also acts as an adhesive to laminate the two insulation layers 24 together. The layers are laminated such that they stay together as a unit during processing.

In the preferred embodiment of FIG. 3, cover layers 26 are positioned on both sides of the core 20. The cover layers 26 can be made from a cloth material, a thin plastic material, or other suitable covering materials.

Also in the preferred embodiment, thin tackable layers 28 are positioned between the insulation layers 24 and the cover layers 26. As used herein, a "tackable layer" 28 is a layer of material which can be penetrated by tacks or pins to allow the office workers to hang papers or similar items on the sound screen. The material of the tackable layers 28 can be the relatively high density glass fiber board described in more detail above, or can be other suitable tackable materials. Preferably each tackable layer 28 has a thickness between about 1/16 inch (0.16 cm) and about 1/2 inch (1.27 cm), and more preferably between about 1/16 inch (0.16 cm) and about 1/4 inch (0.64 cm). If a glass fiber board is used as the insulation layers 24, it is unnecessary to include separate tackable layers 28 in the panel 12 of the sound screen.

While this invention has been described in relation to an office sound screen, it is not limited thereto. For example, this invention can also be used in a sound curtain which is hung around a piece of industrial equipment to reduce the sound therefrom. It can also be used as a sound reducing panel on a boat or other recreational vehicle. Other similar uses are also envisioned. The invention is applicable in any situation where it is desirable to reduce sound transmission and absorb sound. Further, while the invention has been described as a panel, it is not necessarily flat, but can be shaped into any desired form.

As described above, the core 20 of the panel 12 includes an asphalt layer 22 and insulation layers 24 positioned on both sides of the asphalt layer and laminated thereto. The method for making the core 20 presented numerous difficulties. In the past, it was known to use a roll coating apparatus to apply a liquid coating onto paper or similar products. However, it was not previously thought to use a roll coating apparatus to apply a layer of molten asphalt between two layers of fiberglass wool insulation. One reason is that the material being coated by a roll coating apparatus must have sufficient tensile strength to be pulled past the roller without being pulled apart. Fiberglass wool has very little tensile strength and would be pulled apart by a standard roll coating apparatus. Another reason is that molten asphalt readily adheres to metal and to other asphalt, but fiberglass wool is difficult to coat. As a result, the molten asphalt tends to adhere to the roller instead of coating the fiberglass wool. Pieces of the fiberglass wool are pulled out from the insulation layer onto the molten asphalt adhering to the roller. For these reasons, a standard roll coating method is not suitable for applying a layer of asphalt between two fiberglass wool layers so that the layers are laminated together.

However, a method has now been found using a modified roll coating apparatus under specified conditions to apply an asphalt layer between two layers of mineral fiber insulation, and particularly between two fiberglass wool layers. As will be explained in detail below, the roll coating apparatus is modified by the addition of a metal belt conveyor to support the first fiberglass layer. The apparatus is also modified by reversing the direction of rotation of the coater applicator roller and coater gap roller, and reversing their respective positions. In addition, it has been found important to control the surface speed of the coater applicator roller, the gap between the coater applicator roller and the coater gap roller, and the viscosity of the asphalt.

Figure 6:
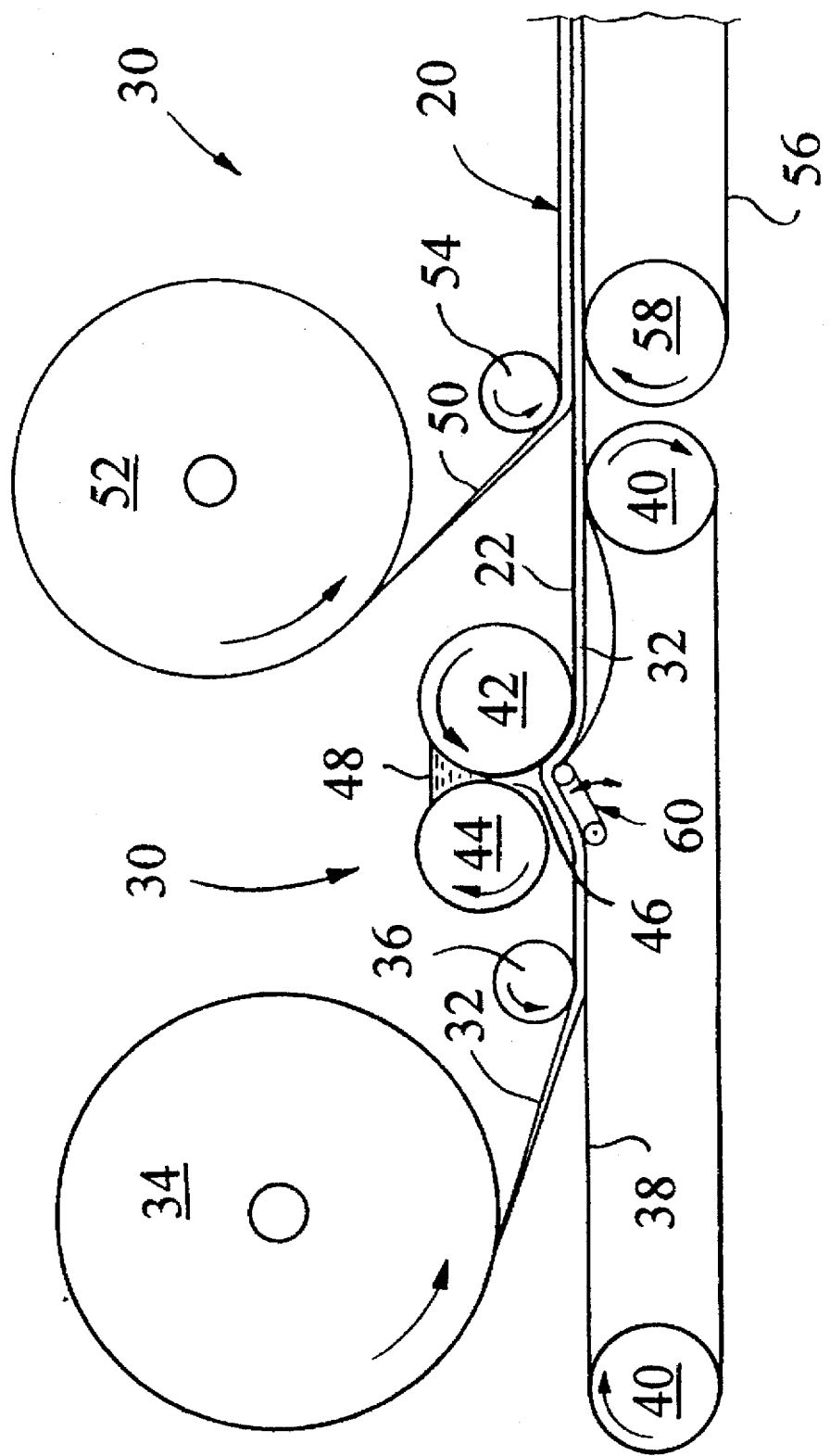
FIG. 6 is a schematic view of a method for making the core of the preferred panel.

Referring now to FIG. 6, the modified roll coating apparatus of the invention is indicated generally at 30. A first layer of mineral fiber such as a first fiberglass layer 32 is fed from a first fiberglass roll 34. The first fiberglass layer 32 is fed between a first pressure roller 36 and a first metal belt conveyor 38. The first metal belt conveyor 38 is driven by a pair of pulleys 40, and it provides support for the first fiberglass layer 32. The first fiberglass layer 32 is then fed to a coater applicator roller 42. Preferably a lift mechanism 60 raises the first metal belt conveyor 38 to bring the first fiberglass layer 32 into contact with a substantial amount of the surface of the coater applicator roller 42. Preferably the first metal belt conveyor 38 sags after passing the lift mechanism 60 to avoid contact with the coater applicator roller 42. A coater gap roller 44 is positioned adjacent to the coater applicator roller 42 with a gap 46 therebetween. The coater applicator roller 42 and coater gap roller 44 are heated, and are generally cylindrical in shape and lie generally parallel with one another. A supply of molten asphalt 48 is provided in a trough formed between the upper portions of the coater applicator roller 42 and the coater gap roller 44. The coater applicator roller 42 and the coater gap roller 44 rotate in opposite directions so that the molten asphalt 48 is drawn downward between the rollers. The coater applicator roller 42 has a larger diameter than the coater gap roller 44, so that the coater applicator roller lies adjacent to the first fiberglass layer 32 whereas the coater gap roller does not. As a result, molten asphalt 48 is carried downward on the surface of the coater applicator roller 42 and applied as an asphalt layer 22 onto the first fiberglass layer 32. At a position adjacent to the first fiberglass layer 32, the surface of the coater applicator roller 42 moves generally in the same direction as the first fiberglass layer 32.

A second layer of mineral fiber such as a second fiberglass layer 50 is fed from a second fiberglass roll 52. The second fiberglass layer 50 adheres to the asphalt layer 22 on the first fiberglass layer 32 as the layers are pulled past a second pressure roller 54. The combined layers form a core 20 in accordance with this invention. The core 20 is then carried by a second metal belt conveyor 56 driven by a pair of pulleys 58 (only one of which is shown). The molten asphalt 48 of the asphalt layer 22 penetrates into and adheres to the first and second fiberglass layers 32 and 50. Thus when the asphalt layer 22 hardens, the first and second fiberglass layers 32 and 50 are laminated to the asphalt layer.

The above-described method overcomes the problems encountered in using a standard roll coating apparatus. The first metal belt conveyor 38 is included in the modified roll coating apparatus 30 to support the first fiberglass layer 32 when it initially contacts the coater applicator roller 42. This overcomes the problem where the first fiberglass layer 32 is pulled apart for lack of tensile strength.

The other problem with a standard roll coating apparatus is that the molten asphalt tends to adhere to the coater applicator roller instead of coating the fiberglass layer. This causes pieces of fiberglass to be pulled out from the fiberglass layer onto the molten asphalt on the roller. It has now been found that this problem can be overcome by maintaining a certain thickness of molten asphalt 48 between the coater applicator roller 42 and the first fiberglass layer 32 as it is being coated. When this is done, the molten asphalt 48 flows onto the first fiberglass layer 32 as a suitable coating, instead of adhering to the coater applicator roller 42. This thickness of molten asphalt 48 is provided by modifying the roll coating apparatus 30 and maintaining particular conditions as will be described below.

The roll coating apparatus 30 has been modified by reversing the direction of rotation of the coater applicator roller 42 and the coater gap roller 44, and reversing their respective positions. Thus, at a position adjacent to the first fiberglass layer 32, the surface of the coater applicator roller 42 moves in the same direction as the first fiberglass layer 32 instead of the opposite direction. This same direction of movement helps to maintain the desired thickness of molten asphalt 48 between the coater applicator roller 42 and the first fiberglass layer 32. The gap between the coater applicator roller 42 and the coater gap roller 44 is also important for this purpose. The gap is maintained between about 0.030 inch (0.076 cm) and about 0.070 inch (0.178 cm), preferably between about 0.050 inch and about 0.065 inch, and more preferably is about 0.060 inch 0.152 cm).

The viscosity of the molten asphalt 48 (including any filler or additive) as it is applied to the first fiberglass layer 32 is maintained between about 1,000 cps and about 10,000 cps, preferably between about 1,500 cps and about 2,500 cps, and more preferably about 2,000 cps. The temperature and composition of the molten asphalt are adjusted to achieve this viscosity. In a preferred embodiment in which the molten asphalt 48 is 50% asphalt and 50% calcium carbonate filler, and the molten asphalt is maintained at a temperature of about 410° F. (210° C.) to achieve a 2,000 cps viscosity. In general, preferably the molten asphalt is maintained at a temperature between about 375° F. (191° C.) and about 450° F. (232° C.), more preferably between about 390° F. (199° C.) and about 425° F. (218° C.).

Additionally, it has been found important to control the surface speed of the coater applicator roller 42 relative to speed of the first fiberglass layer 32. The surface speed of the coater applicator roller 42 is between about 1.5 times and about 3.0 times the speed of the first fiberglass layer 32, and preferably is between about 2.0 times and about 2.5 times the speed of the first fiberglass layer. In a preferred embodiment, the surface speed of the coater applicator roller 42 is about 80 feet/minute (about 24.38 meters/minute) and the speed of the first fiberglass layer 32 is about 40 feet/minute (about 12.19 meters/minute). These above-described preferred conditions form an asphalt layer 22 having a thickness of about 0.030 inch (0.076 cm).

Another suitable method for making a core 20 is by extruding a film of asphalt of the appropriate thickness and passing it between two layers of fiberglass wool while the film is still hot.

In accordance with the provisions of the patent statutes, the principle and mode of operation of this invention have been explained and illustrated in its preferred embodiment. However, it must be understood that this invention may be practiced otherwise than a ms specifically explained and illustrated without departing from its spirit or scope. For example, it is recognized that additional layers of material may be used in the sound screen along with those described above.

INDUSTRIAL APPLICABILITY

The invention can be useful when used as sound screens for offices, and in the manufacture of sound screens.

We claim:

1. An insulation panel for reducing sound, comprising:
   a core comprising an asphalt layer and insulation layers positioned on both sides of the asphalt layer and laminated thereto;
   a rigid frame positioned around and secured to at least three edges of the panel; and
   a cover layer positioned on at least one side of the core.

2. The panel defined in claim 1 wherein the asphalt layer has a thickness between about 0.030 inch (0.076 cm) and about 0.125 inch (0.318 cm).

3. The panel defined in claim 1 wherein the asphalt layer acts as an adhesive to hold the insulation layers together.

4. The panel defined in claim 1 wherein the asphalt layer additionally includes a filler selected from the group consisting of calcium carbonate, calcium oxide, clay, glass, mica, barium, and mixtures thereof.

5. The panel defined in claim 1 wherein the asphalt is modified with a polymer selected from the group consisting of styrene/butadiene copolymers, copolymers of SBS thermoplastic rubber and styrene monomer, ethylene copolymers, polybutadiene, polypropylene, and mixtures thereof.

6. The panel defined in claim 1 wherein the insulation layers comprise insulating material selected from the group consisting of mineral fiber insulating material and foamed plastic insulating material.

7. The panel defined in claim 6 wherein the asphalt layer has first and second sides, and the insulation layers comprise a first insulation layer comprising at least two pieces of mineral fiber board positioned end to end and laminated to the first side of the asphalt layer, and a second insulation layer comprising at least two pieces of mineral fiber board positioned end to end and laminated to the second side of the asphalt layer.

8. The panel defined in claim 6 wherein the insulation layers comprise fibrous glass wool having a density between about 0.5 pounds per cubic foot (8 kg/m$^3$) and about 5 pounds per cubic foot (80 kg/m$^3$), wherein the glass fibers have an average diameter between about 3 microns and about 12 microns, and wherein each insulation layer has a thickness between about ½ inch (1.27 cm) and about 2 inches (5.08 cm).

9. The panel defined in claim 1 wherein the panel additionally comprises at least one tackable layer positioned between at least one insulation layer and cover layer.

10. The panel defined in claim 9 wherein the tackable layer comprises glass fiber board having a density between about 6 pounds per cubic foot (96 kg/m$^3$) and about 28 pounds per cubic foot (448 kg/m$^3$) and a thickness between about 1/16 inch (0.16 cm) and about ½ inch (1.27 cm).

11. The panel defined in claim 1 wherein a cover layer is positioned on both sides of the core.

12. An insulation panel for reducing sound comprising:

a core comprising an asphalt layer and insulation layers positioned on both sides of the asphalt layer and laminated thereto;

a rigid frame positioned around and secured to at least three edges of the panel; and a cover layer positioned on at least one side of the core, wherein the Sound Transmission Class of the core is between about 10 decibels and about 50 decibels.

13. The panel defined in claim 12 wherein the Noise Reduction Coefficient of the core is between about 0.5 and about 1.0.

* * * * *